US010338597B2

(12) United States Patent
Hashimoto et al.

(10) Patent No.: US 10,338,597 B2
(45) Date of Patent: Jul. 2, 2019

(54) SELF-TRAVELING ARTICULATED ROBOT

(71) Applicant: KAWASAKI JUKOGYO KABUSHIKI KAISHA, Kobe-shi, Hyogo (JP)

(72) Inventors: Yasuhiko Hashimoto, Kobe (JP); Takahiro Inada, Kakogawa (JP); Kenji Bando, Nishinomiya (JP); Yoshiaki Tanaka, Akashi (JP); Junichi Murakami, Kobe (JP); Satoru Hibino, Kobe (JP); Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 82 days.

(21) Appl. No.: 15/539,814

(22) PCT Filed: Dec. 26, 2014

(86) PCT No.: PCT/JP2014/006494
§ 371 (c)(1),
(2) Date: Jun. 26, 2017

(87) PCT Pub. No.: WO2016/103303
PCT Pub. Date: Jun. 30, 2016

(65) Prior Publication Data
US 2017/0371342 A1 Dec. 28, 2017

(51) Int. Cl.
G05B 15/00 (2006.01)
G05B 19/00 (2006.01)
(Continued)

(52) U.S. Cl.
CPC ............ G05D 1/0234 (2013.01); B25J 5/007 (2013.01); B25J 9/0087 (2013.01); B25J 9/0096 (2013.01);
(Continued)

(58) Field of Classification Search
CPC ........ B25J 13/089; B25J 19/005; B25J 5/007; B25J 9/0087; B25J 9/0096; B25J 9/043; B25J 9/044; G05D 1/0234
See application file for complete search history.

(56) References Cited

U.S. PATENT DOCUMENTS 8,738,181 B2 * 5/2014 Greer ................... B25J 9/1671
600/130
8,972,057 B1 * 3/2015 Freeman ............... B25J 9/1666
700/246
(Continued)

FOREIGN PATENT DOCUMENTS

CN 103796806 A 5/2014
DE 102012100324 A1 7/2013
(Continued)

OTHER PUBLICATIONS

Mar. 24, 2015 Search Report issued in International Patent Application No. PCT/JP2014/006494.
(Continued)

Primary Examiner — Harry Y Oh
(74) Attorney, Agent, or Firm — Oliff PLC

(57) ABSTRACT

A self-traveling articulated robot for working in a production factory is provided, which includes a carriage having at least two operation shafts driven by servomotors, respectively, and self-travelable in a two-dimensional plane, a robotic arm supported by the carriage and having at least one operation shaft driven by a servomotor and constituting a joint, an end effector provided to a tip portion of the robotic arm, and a control unit provided in the carriage and for controlling the operation shaft of the robotic arm and the operation shafts of the carriage to operate in cooperation with each other so that a control point defined in one of the robotic arm and the end effector reaches a target position.

5 Claims, 5 Drawing Sheets

(51) Int. Cl.
*G05D 1/02* (2006.01)
*B25J 5/00* (2006.01)
*B25J 9/00* (2006.01)
*B25J 9/04* (2006.01)
*B25J 13/08* (2006.01)
*B25J 19/00* (2006.01)

(52) U.S. Cl.
CPC .............. *B25J 9/043* (2013.01); *B25J 9/044* (2013.01); *B25J 13/089* (2013.01); *B25J 19/005* (2013.01); *G05D 2201/0216* (2013.01)

(56) References Cited

U.S. PATENT DOCUMENTS

| | | | | |
|---|---|---|---|---|
| 9,345,544 | B2* | 5/2016 | Hourtash | ............... B25J 9/1607 |
| 9,383,752 | B2* | 7/2016 | Mian | ..................... G05D 1/0229 |
| 9,415,513 | B2* | 8/2016 | Tian | ........................ B25J 9/1666 |
| 2008/0184375 | A1* | 7/2008 | Nonaka | ............... G06F 21/6245 |
| | | | | 726/27 |
| 2010/0222925 | A1* | 9/2010 | Anezaki | ............... G05D 1/0221 |
| | | | | 700/253 |
| 2012/0072023 | A1* | 3/2012 | Ota | ........................ B25J 9/1664 |
| | | | | 700/259 |
| 2014/0188323 | A1* | 7/2014 | Kouno | ..................... B25J 5/007 |
| | | | | 701/23 |
| 2014/0247116 | A1* | 9/2014 | Davidson | ............. G06Q 10/087 |
| | | | | 340/10.1 |
| 2015/0032252 | A1* | 1/2015 | Galluzzo | .................. B25J 5/007 |
| | | | | 700/218 |

FOREIGN PATENT DOCUMENTS

| | | |
|---|---|---|
| EP | 2 756 929 A1 | 7/2014 |
| JP | S62-203789 A | 9/1987 |
| JP | H03-79285 A | 4/1991 |
| JP | H04-188305 A | 7/1992 |
| JP | H04-360779 A | 12/1992 |
| JP | H05-16849 A | 1/1993 |
| JP | H11-320465 A | 11/1999 |
| JP | 2001-092529 A | 4/2001 |
| JP | 2001-300875 A | 10/2001 |
| JP | 2005-275725 A | 10/2005 |
| JP | 2006-236109 A | 9/2006 |
| JP | 2008-142841 A | 6/2008 |
| JP | 2010-064198 A | 3/2010 |
| WO | 2012/122633 A1 | 9/2012 |
| WO | 2013/038998 A1 | 3/2013 |

OTHER PUBLICATIONS

Jun. 27, 2017 International Preliminary Report on Patentability issued in International Patent Application No. PCT/JP2014/006494.
Iwata et al.; "Design of Human Symbiotic Robot Twendy-One;" 2009 IEEE International Conference on Robotics and Automation : (ICRA); Kobe, Japan; May 12-17, 2009; pp. 580-586; XP031509936.

* cited by examiner

SELF-TRAVELING ARTICULATED ROBOT

TECHNICAL FIELD

The present invention relates to a self-traveling articulated robot, which includes a carriage and a robotic arm supported by the carriage.

BACKGROUND ART

Conventionally, line production systems of a human-and-robot collaborating type are proposed for assembling process of electric and/or electronic components, etc., in which workers and work robots stationed serially along a conveyance line of workpiece collaborate. For example, Patent Document 1 discloses a dual-arm work robot used for the human-and-robot collaborating type line production system.

The dual-arm work robot of Patent Document 1 includes a main body, a head, two arms, a hand attached to respective tip-ends of the arm, and a carriage which supports a lower part of the main body. A lower part of the carriage has four fixed legs, two swivel casters located at a rear side of the carriage and two driving wheels located at a front side of the carriage. A state of this carriage can be switched between a movable state by being supported by the casters and the driving wheels and a positionally fixed state by being supported by the fixed legs. Further, each of the driving wheels is connected to a traveling drive motor provided with a clutch and controlled by a controller (control box). A state of the driving wheels is switchable between a freely-rotatable state by disengaging the clutch and a driving state by being connected to the traveling drive motors and driven thereby.

When installing the dual-arm work robot with the above structure on a workbench, an operator manually pushes the carriage supported by the freely-rotatable driving wheels to the workbench and then fixes the position of the carriage. If the robot moved during the work and requires a correction in the work position, the controller controls the arms to extend and engage anchor pins provided at tip portions of the arms with anchor points provided to the workbench, switches the carriage to the state supported by the freely-rotatable driving wheels, and pulls the extended arms to move the carriage to a desired work position. When the correction amount of the work position is large, the controller switches the carriage to the state supported by the driving wheels, and drives the driving wheels with the traveling drive motors to cause the carriage to travel, so as to move the carriage to the desired work position.

REFERENCE DOCUMENT OF CONVENTIONAL ART

Patent Document

[Patent Document 1] JP2010-064198A

DISCLOSURE OF THE INVENTION

Problems to be Solved by the Invention

In the dual-arm work robot of Patent Document 1, since the arms are used to correct the work position of the robot, the work position cannot be corrected while the robot is working. Further in the dual-arm work robot of Patent Document 1, since the position of the robot is corrected for the purpose of fixing the work position of the robot, a case where the robot works while moving is not taken into consideration.

The present invention is made in view of the above situations and aims to propose a self-traveling articulated robot, which works in a factory for manufacturing products by a line production system or a cell production system, and is workable while moving.

SUMMARY OF THE INVENTION

According to one aspect of the present invention, a self-traveling articulated robot for working in a production factory is provided, which includes a carriage having at least two operation shafts driven by servomotors, respectively, and self-travelable in a two-dimensional plane, a robotic arm supported by the carriage and having at least one operation shaft driven by a servomotor and constituting a joint, an end effector provided to a tip portion of the robotic arm, and a control unit provided in the carriage and for controlling the operation shaft of the robotic arm and the operation shafts of the carriage to operate in cooperation with each other so that a control point defined in one of the robotic arm and the end effector reaches a target position.

Thus, the robotic arm and the carriage are operable in cooperation with each other. In other words, the robotic arm is workable while the carriage which is the pedestal of the robotic arm moves.

Effect of the Invention

According to the present invention, a self-traveling articulated robot is obtained, which works in a factory for manufacturing products and is workable while moving.

MODE FOR CARRYING OUT THE INVENTION

Next, one embodiment of the present invention is described with reference to the accompanying drawings. A self-traveling articulated robot of the present invention is used in a production factory for manufacturing products by assembling electric, electronic parts, etc. in a line production system or a cell production system, for example. The self-traveling articulated robot is disposed along a workbench provided in the production factory and is for performing at least one of conveyance, attachment and rearrangement of parts, posture change, etc. on a workpiece on the workbench.

Figure 1:
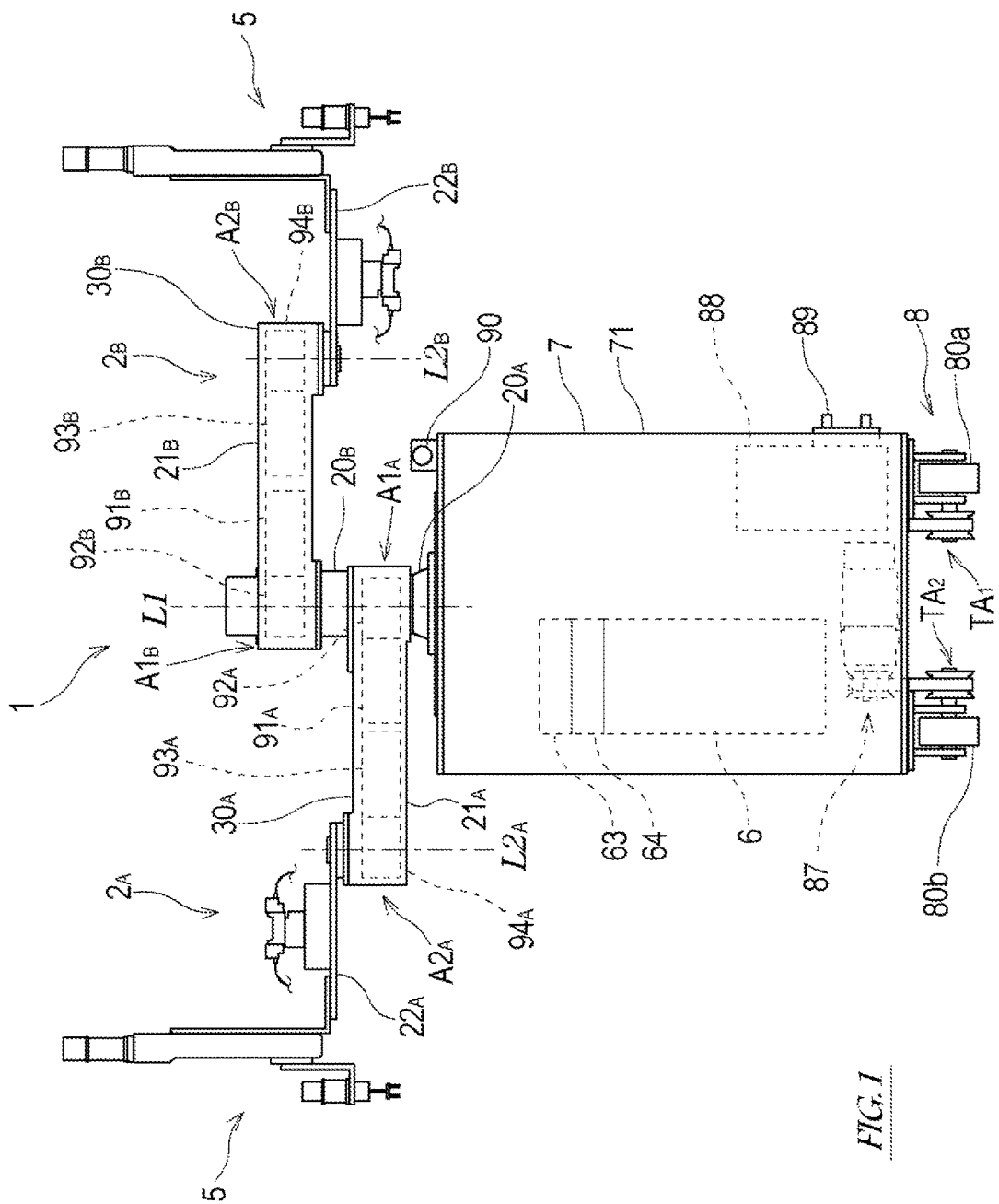
FIG. 1 is a front view illustrating a schematic structure of a self-traveling articulated robot according to one embodiment of the present invention.
Figure 2:
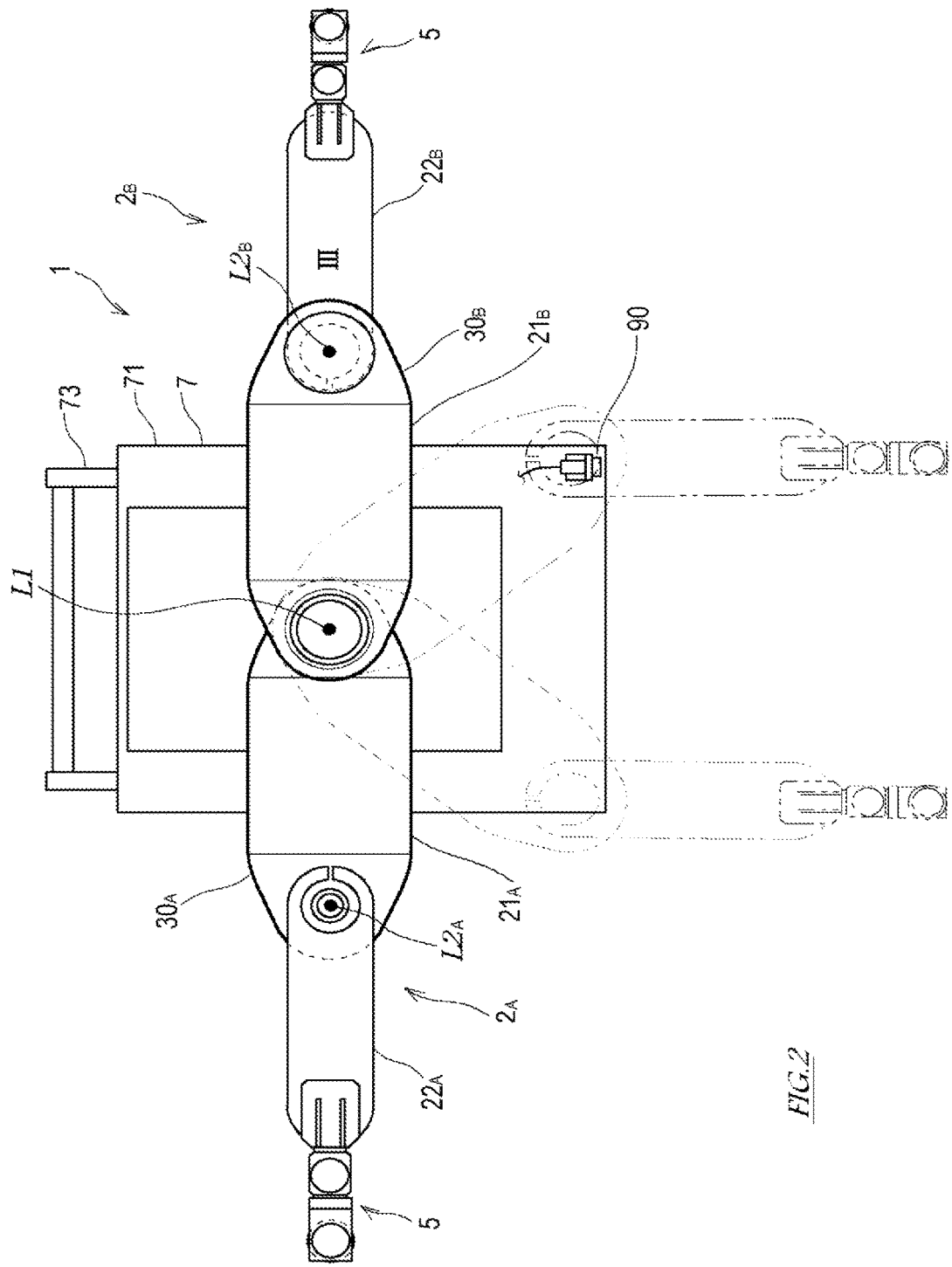
FIG. 2 is a plan view of the self-traveling articulated robot illustrated in FIG. 1.
Figure 3:
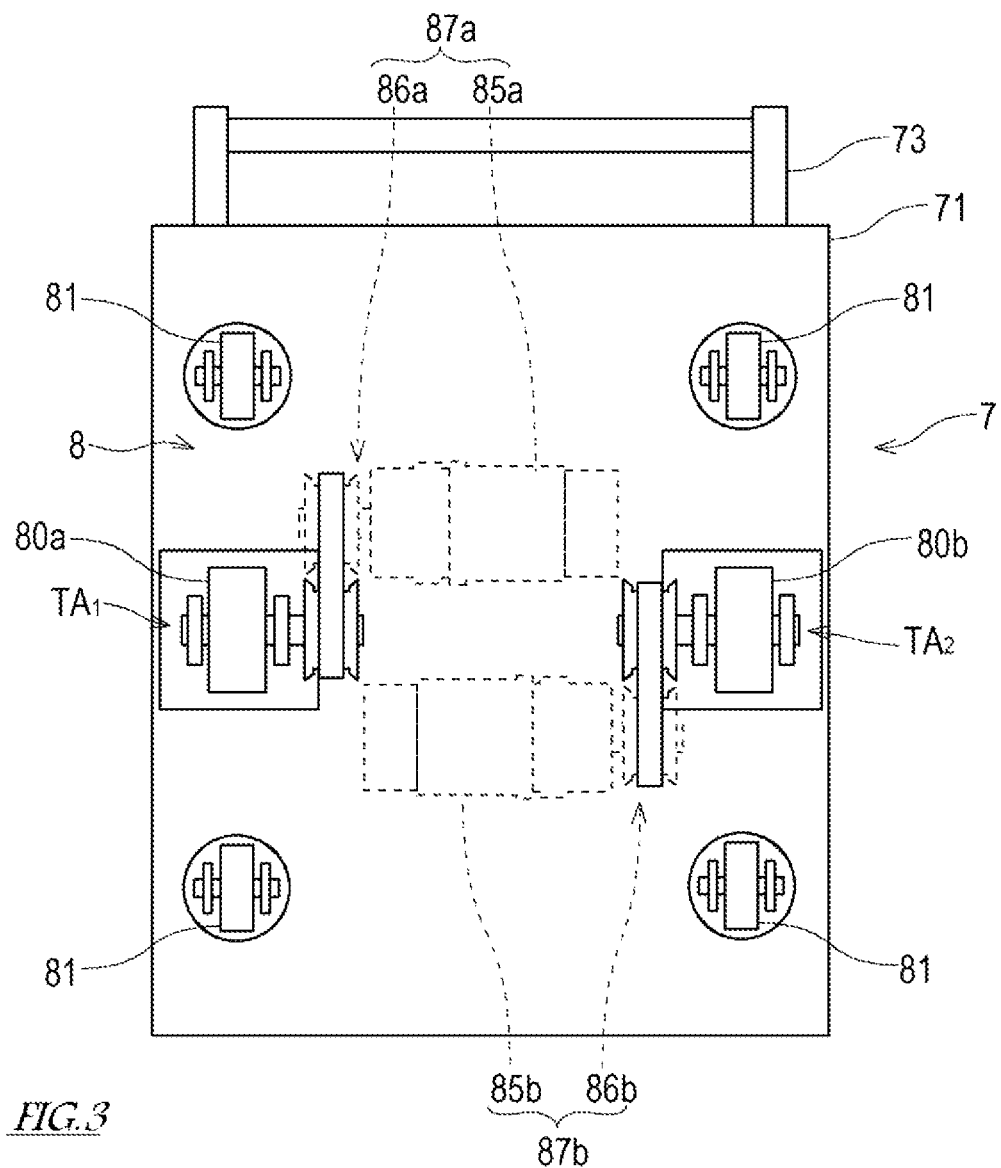
FIG. 3 is a bottom view of the self-traveling articulated robot illustrated in FIG. 1.

FIG. 1 is a front view illustrating an entire structure of a self-traveling articulated robot 1 according to one embodiment of the present invention. FIG. 2 is a plan view of the robot 1 illustrated in FIG. 1. FIG. 3 is a bottom view of the robot 1 illustrated in FIG. 1. As illustrated in FIGS. 1 to 3, the self-traveling articulated robot (hereinafter, may simply be referred to as "the robot 1") according to one embodiment of the present invention includes a carriage 7 for self-travelling in a two-dimensional plane, at least one robotic arm ($2_A$ and $2_B$) supported by the carriage 7, end effectors 5 detachably attached to tip portions of the robotic arms $2_A$ and $2_B$, respectively, a positioning unit 63, a marker detecting unit 64, and a control unit 6 for controlling operations of the robotic arms $2_A$ and $2_B$ and the carriage 7. Operations of the end effectors 5 may also be controlled by the control unit 6. Hereinafter, the respective components of the robot 1 are described in detail.

First, the robotic arms $2_A$ and $2_B$ are described. The robot 1 of this embodiment is a dual-arm robot including left and right robotic arms $2_A$ and $2_B$. The left and right robotic arms $2_A$ and $2_B$ are operable independently from or in association with each other. Thus, the left and right robotic arms $2_A$ and $2_B$ can perform different works or a single work in cooperation with each other. Note that, the robot 1 according to the present invention is not limited to the dual-arm robot, and may include at least one robotic arm.

One robotic arm $2_A$ includes a first link $21_A$ for rotating about a first axis L1, and a second link $22_A$ coupled to the first link $21_A$ to be rotatable about a second axis $L2_A$ defined in the tip portion of the first link $21_A$. Similarly, the other robotic arm $2_B$ includes a first link $21_B$ for rotating about a first axis L1, and a second link $22_B$ coupled to the first link $21_B$ to be rotatable about a second axis $L2_B$ defined in the tip portion of the first link $21_B$. The first axes L1 are parallel to the second axes $L2_A$ and $L2_B$, and the first axes L1 and the second axes $L2_A$ and $L2_B$ of this embodiment extend vertically.

The first axes L1 of the first links $21_A$ and $21_B$ of the two robotic arms $2_A$ and $2_B$ match with each other, and the first link $21_A$ of one robotic arm $2_A$ and the first link $21_B$ of the other robotic arm $2_B$ are disposed at vertically different positions. Hereinafter, one of the two robotic arms $2_A$ and $2_B$ in which the first link $21_A$ is located lower is referred to as the first arm $2_A$, and the other robotic arm is referred to as the second arm $2_B$.

Here, the structure of the first arm $2_A$ is described in detail. The first link $21_A$ of the first arm $2_A$ is rotatably supported by a base shaft $20_A$ fixed to an upper surface of the carriage 7 via a bearing (not illustrated). The second link $22_A$ of the first arm $2_A$ is rotatably supported by the tip portion of the first link $21_A$ via a bearing (not illustrated).

A hollow link member $30_A$ forms an outer shape of the first link $21_A$. The link member $30_A$ is provided therein with a servomotor $91_A$ and a power transmission device $92_A$ which are for rotating the first link $21_A$ about the first axis L1. The power transmission device $92_A$ also has a function as a decelerator for adjusting the rotational torque. Thus, the first arm $2_A$ has an operation shaft (first shaft $A1_A$) driven by the servomotor $91_A$ and constituting a joint joining the base shaft $20_A$ to the first link $21_A$.

The link member $30_A$ is further provided therein with a servomotor $93_A$ and a power transmission device $94_A$ which are for rotating the second link $22_A$ about the second axis $L2_A$. The power transmission device $94_A$ also has a function as a decelerator for adjusting the rotational torque. Thus, the first arm $2_A$ has an operation shaft (second shaft $A2_A$) driven by the servomotor $93_A$ and constituting a joint joining the first link $21_A$ to the second link $22_A$.

Next, the second arm $2_B$ is described in detail. A base shaft $20_B$ of the second arm $2_B$ is fixed on the first link $21_A$ of the first arm $2_A$. The second arm $2_B$ has a similar structure to that of the first arm $2_A$. Therefore, in each drawing, each of the components of the first arm $2_A$ is assigned with a reference character of a numeral accompanied by alphabet A, and each of the components of the second arm $2_B$ is assigned with a reference character of a numeral accompanied by alphabet B. The components with the reference characters including the same numeral are common elements between the first arm $2_A$ and the second arm $2_B$, and they have the same or similar functions and shapes. A detailed description of the structure of the second arm $2_B$ is omitted by replacing, with the alphabet B, alphabet A accompanying the reference characters in the description of the first arm $2_A$ described above.

Next, the carriage 7 is described. The carriage 7 includes a housing 71 having a cuboid shape, a handle 73 provided on a back surface of the housing 71, and a traveling device 8 provided to a lower part of the housing 71. The housing 71 is hollow and provided therein with the control unit 6, a battery 88, the positioning unit 63, the marker detecting unit 64, an air pressure supply device (not illustrated), etc. A charging electrode 89 of the battery 88 appears on a side surface of the housing 71 of the carriage 7. At least one camera 90, such as a machine vision camera, is provided to an upper part of the housing 71.

The traveling device 8 includes two driving wheels 80a and 80b and four universal wheels 81. The two driving wheels 80a and 80b are arranged to be spaced apart from each other so that axial directions of rotational shafts thereof are parallel to front and rear directions of the robot 1 in a basic posture. The four universal wheels 81 are disposed at four corners of a bottom surface of the housing 71 of the carriage 7 in a balanced manner. The axial directions of the rotational shafts of the four universal wheels 81 are freely changeable according to an applied external force.

The traveling device 8 further includes drive mechanisms 87a and 87b having similar to or same structures as each other in the two driving wheels 80a and 80b, respectively. The drive mechanism 87a of the driving wheel 80a is comprised of a servomotor 85a as a drive source and a power transmission device 86a for transmitting power from the servomotor 85a to the driving wheel 80a. The power transmission device 86a is comprised of, for example, a decelerator for adjusting output torque of the servomotor 85a and a belt transmission mechanism for transmitting power from the decelerator to the driving wheel 80a. Thus, the carriage 7 has an operation shaft (first traveling shaft $TA_1$) driven by the servomotor 85a.

Similarly, the drive mechanism 87b of the driving wheel 80b is comprised of a servomotor 85b as a drive source and a power transmission device 86b for transmitting power from the servomotor 85b to the driving wheel 80b. The power transmission device 86b is comprised of, for example, a decelerator for adjusting output torque of the servomotor 85b, and a belt transmission mechanism for transmitting a power from the decelerator to the driving wheel 80b. Thus, the carriage 7 has an operation shaft (second traveling shaft $TA_2$) driven by the servomotor 85b.

In this embodiment, the first traveling shaft $TA_1$ is defined on a rotation axis of the driving wheel 80a. Similarly in this embodiment, the second traveling shaft $TA_2$ is defined on a rotation axis of the driving wheel 80b. Note that, although in this embodiment the rotation axis of the driving wheel 80a matches with the first traveling shaft $TA_1$, the first traveling shaft $TA_1$ may be defined at a suitable position on the power transmitting path to the driving wheel 80a. Similarly, although in this embodiment the rotation axis of the driving wheel 80b matches with the second traveling shaft $TA_2$, the second traveling shaft $TA_2$ may be defined at a suitable position on the power transmitting path to the driving wheel 80*b*.

In the traveling device 8 having the above structure, the rotating directions and the rotational speeds of the first and second traveling shafts $TA_1$ and $TA_2$ are controlled by the control unit 6 so that the carriage 7 travels in the two-dimensional plane (XY plane). For example, when the first and second traveling shafts $TA_1$ and $TA_2$ are driven to rotate in the same direction at the same rotational speed, the carriage 7 travels straight forward or backward. For example, when the first and second traveling shafts $TA_1$ and $TA_2$ are driven to rotate in the same direction at different rotational speeds, the carriage 7 travels forward or backward while turning and a track of the carriage 7 curves. For example, when the first and second traveling shafts $TA_1$ and $TA_2$ are rotated in different directions from each other, the carriage 7 turns on the spot.

Figure 4:
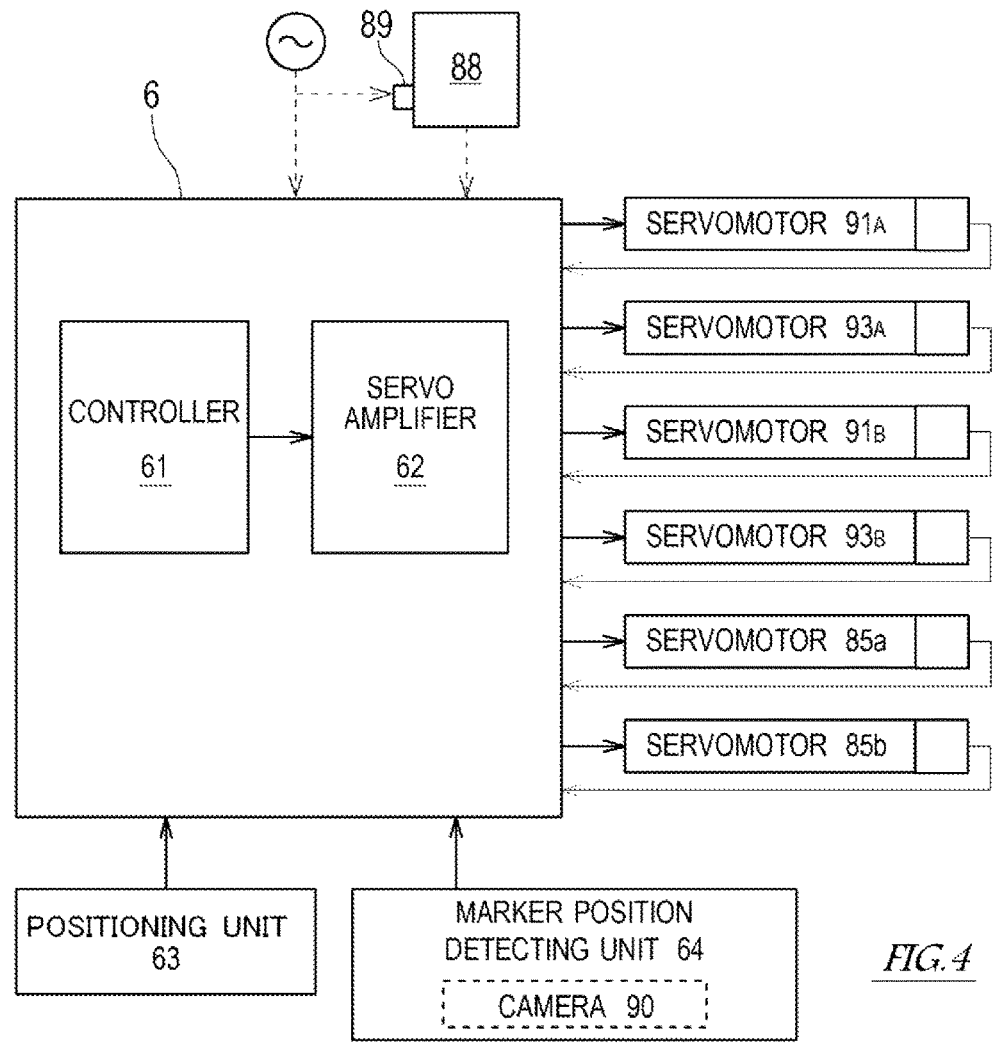
FIG. 4 is a block diagram illustrating a schematic configuration of a control system of the self-traveling articulated robot illustrated in FIG. 1.

Next, the control unit 6 is described. FIG. 4 is a view illustrating a configuration of a control system of the robot 1. As illustrated in FIG. 4, the control unit 6 is provided with a controller 61 and a servo amplifier 62. The control unit 6 is connected to the positioning unit 63 and the marker detecting unit 64. The control unit 6 is receivable of electric power from both of a commercial power source and the battery 88. The control unit 6 receives electric power mainly from the commercial power source when connected to the commercial power source, and receives electric power from the battery 88 when disconnected from the commercial power source.

The servo amplifier 62 is configured to supply, based on control signals (positioning commands) supplied from the controller 61, a drive current to each of the servomotors $91_A$ and $93_A$ for operating the operation shafts of the first arm $2_A$ (i.e., the first and second shaft $A1_A$ and shaft $A2_A$), the servomotors $91_B$ and $93_B$ for operating the operation shafts of the second arm $2_B$ (i.e., the first and second shaft $A1_B$ and $A2_B$), and the servomotors 85*a* and 85*b* for operating the operation shafts of the traveling device 8 (i.e., the first and second traveling shafts $TA_1$ and $TA_2$). Note that, the servo amplifier 62 is provided corresponding to each of the servomotors $91_A$, $93_A$, $91_B$, $93_B$, 85*a* and 85*b*, and these servo amplifiers 62 are illustrated collectively.

Each of the servomotors $91_A$, $93_A$, $91_B$, $93_B$, 85*a* and 85*b* is provided with a rotation detector for detecting a rotation amount, a rotational angle, a rotational position, etc. of an output shaft, such as a rotary encoder, and at least the rotational position of the output shaft of each servomotor detected by this rotation detector is inputted to the controller 61 and the servo amplifier 62.

The controller 61 is a so-called computer, and has an arithmetic processor, such as a CPU, and a memory, such as ROM and/or RAM (none of them is illustrated). The memory stores program(s) executed by the arithmetic processor, various fixed data, etc. The arithmetic processor exchanges data with an external device. Further, the arithmetic processor receives detection signals from various sensors and outputs control signals to respective control targets. In the controller 61, the arithmetic processor performs processing(s) of controlling the operation of the robot 1 by reading and executing software, such as the program(s) stored in the memory. Note that, the controller 61 may execute each processing by a centralized control performed with a single computer, or by a distributed control with a plurality of computers cooperating with each other. Further, the controller 61 may be comprised of a microcontroller, a programmable logic controller (PLC), etc.

Next, the positioning unit 63 is described. The positioning unit 63 is a device for detecting a current position of the carriage 7. The current position of the carriage 7 detected by the positioning unit 63 is transmitted to the controller 61. The positioning unit 63 is comprised of, for example, a GPS (Global Positioning System) antenna and an arithmetic unit for calculating the current position and a current posture of the carriage 7 based on radio waves received by the antenna. Note that, other than the sensor for detecting an absolute position (such as a GPS), a sensor for detecting a relative position such as an acceleration sensor for detecting accelerations in three directions orthogonal to each other (i.e., three-dimensional space) may be used as the positioning unit 63.

Next, the marker detecting unit 64 is described. The marker detecting unit 64 is a device for detecting a positional relationship between a marker (described later) and the carriage 7. The positional relationship between the marker and the carriage 7 detected by the marker detecting unit 64 is transmitted to the controller 61. For example, the marker detecting unit 64 is comprised of the camera 90 provided to the carriage 7, and an arithmetic unit for performing image processing on image signals transmitted from the camera 90 to calculate characteristic amounts (area, center of gravity, length, position, etc.), and detecting the positional relationship between the marker and the carriage 7 based on the calculated characteristic amounts.

In the robot 1 having the above configuration, the control unit 6 detects detection signals or measurement signals from the positioning unit 63, the marker detecting unit 64, and the rotation detectors provided in the respective servomotors $91_A$, $93_A$, $91_B$, $93_B$, 85*a* and 85*b*, and calculates a current position of a control point defined in a tip portion of each of the robotic arms $2_A$ and $2_B$ or each of the end effectors 5. The control unit 6 generates control signals such that the control points move to target positions along given tracks according to a given program. These control signals are outputted from the controller 61 to the servo amplifier 62. The servo amplifier 62 supplies drive currents corresponding to the control signals to the servomotors $91_A$, $93_A$, $91_B$, $93_B$, 85*a* and 85*b*. Thus, the control unit 6 also performs an automatic control (i.e., servo control) on the operation shafts of the traveling device 8 similarly to the operation shafts of the robotic arms $2_A$ and $2_B$, so as to follow target values of control amounts such as the positions, azimuths, postures, etc. of the end effectors 5.

Figure 5:
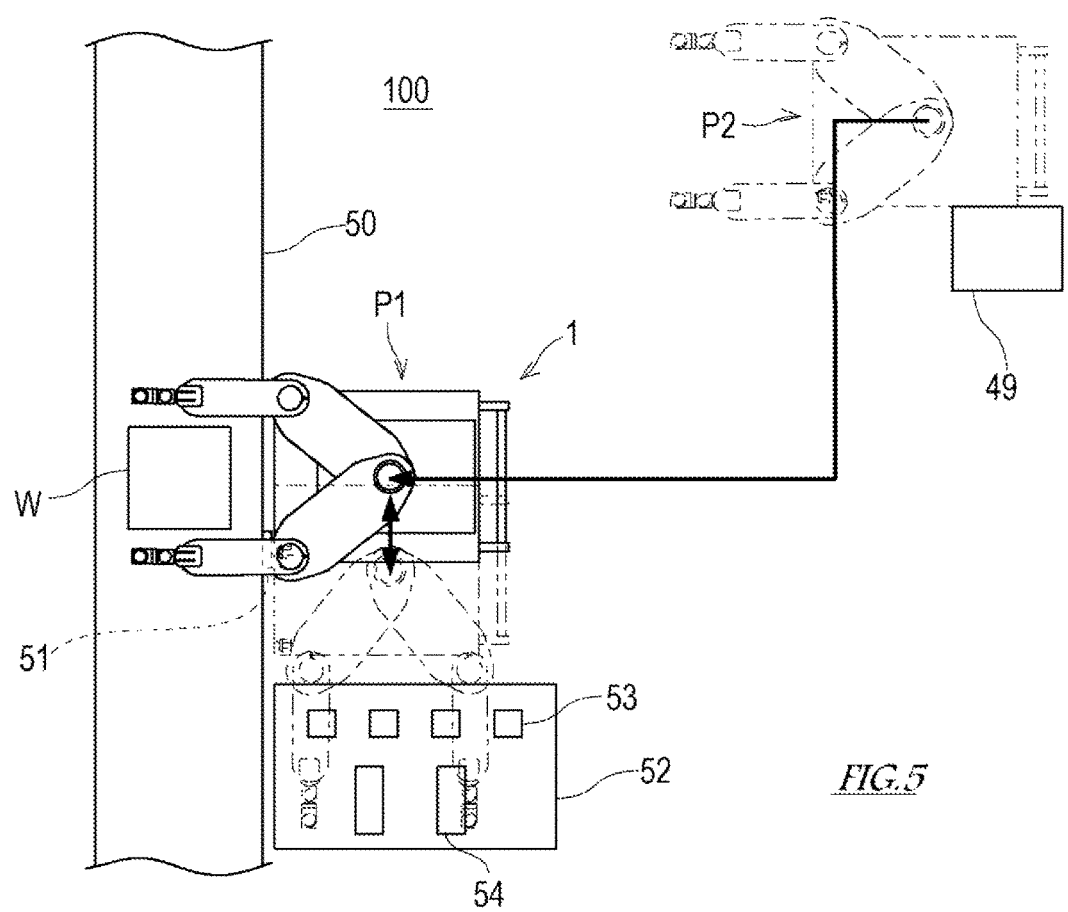
FIG. 5 is a view illustrating one example of a production factory to which the self-traveling articulated robot is introduced.

Here, one example of using the robot 1 having the above configuration is described. FIG. 5 illustrates one example of a production factory 100 to which the robot 1 of this embodiment is introduced. The production factory 100 illustrated in FIG. 5 adopts a line production system, and a conveying line 50 for conveying a workpiece W is provided. Note that, the production factory 100 to which the robot 1 is introduced is not limited to the line production system, and for example, a cell production system may be adopted. In this embodiment, an upper surface of the conveying line 50 is used as a workbench. Note that, a workbench may separately be provided, or an upper surface of the housing 71 of the carriage 7 of the robot 1 may be used as a workbench.

In the production factory 100, a charging station 49 is provided at a separate position from the conveying line 50. The robot 1, when not working, is connected to the charging station 49 at a charging position P2 and stands by while charging the battery 88.

The robot 1 is defined with a carriage reference point as a reference of the position in the two-dimensional plane on which the carriage 7 travels. This carriage reference point may be defined in the carriage 7 or may be defined in the robotic arms $2_A$ and $2_B$ or the end effectors 5. Further, the carriage reference point may be the same as a control point of the robot 1. A reference work position P1 along the conveying line 50 is defined as one of target positions of this carriage reference point in advance. The reference work position P1 is a reference position for when the robot 1 works. Note that, although the carriage reference point, the reference work position P1, and the charging position P2 may be defined by positions (coordinates) in the two-dimensional plane or three-dimensional space, in order to simplify the operation of the control unit 6, they are desirably treated as the positions in the two-dimensional plane.

A placing table 52 on which assembly parts 53 and 54 to be assembled with the workpiece W are placed is provided around the reference work position P1. Moreover, a marker 51 for positioning the robot 1 (particularly, the carriage 7) is provided at or near the reference work position P1. Note that the marker 51 is provided at a position capturable by the camera 90 when the carriage reference point of the robot 1 is at or near the reference work position P1. In other words, the marker 51 is provided at or near the target position (here, reference work position P1) of the carriage reference point. Note that "near the target position" means an area capturable by the camera 90 when the carriage reference point of the robot 1 is at the target position, and in which the marker 51 captured by the camera 90 is identifiable by image processing. In this embodiment, the marker 51 is provided on a side surface of the conveying line 50 which corresponds to a front surface of the camera 90 when the carriage reference point of the robot 1 is at the reference work position P1. Note that, although is not illustrated, another marker is also provided at or near the charging position P2 of the charging station 49.

The control unit 6 has a plurality of control modes including "working mode" which is a control mode when the robot 1 works on the workpiece W, and "traveling mode" which is a control mode when the robot 1 moves between the charging position P2 connected to the charging station 49 and the reference work position P1. In the working mode, the operation shafts of the robotic arms $2_A$ and $2_B$ and the carriage 7 are controlled to operate in cooperation with each other so that the control points defined in the robotic arms $2_A$ and $2_B$ or the end effectors 5 reach the target positions. In other words, in the working mode, the position of the robot 1 is controlled three dimensionally. In the traveling mode, the operation shafts of the carriage 7 are controlled so that the carriage reference point defined in the robot 1 reaches the target position. In other words, in the traveling mode, the position of the robot 1 is controlled two dimensionally.

Before the work starts, the robot 1 moves to the reference work position P1. The control unit 6 in this traveling mode controls the operation shafts of the carriage 7 so that the current position of the carriage reference point approaches the reference work position P1, based on the current position of the carriage 7 detected by the positioning unit 63.

When the current position of the carriage reference point sufficiently approaches the reference work position P1 to such an extent that the marker 51 enters the capturing range of the camera 90, the control unit 6 controls the operation shafts of the carriage 7 so that the current position of the carriage reference point reaches the reference work position P1, based on the positional relationship between the marker 51 detected by the marker detecting unit 64 and the carriage 7.

Note that, although in the above description the control of the control unit 6 when the robot 1 is moved from the charging position P2 to the reference work position P1 is described, also in a case of moving the robot 1 from the reference work position P1 to the charging position P2, a similar control to the control descried above is performed by the control unit 6.

As described above, the robot 1 starts working after the robot 1 moves to the reference work position P1. The control unit 6 in the working mode calculates the current positions of the control points from the rotational positions of the servomotors $91_A$, $93_A$, $91_B$, $93_B$, 85a and 85b equipped in the robot 1, and controls the operation shafts of the robotic arms $2_A$ and $2_B$ and the carriage 7 so that the current positions of the control points reach the target positions by passing through tracks stored in advance.

For example, the assembly parts 53 placed at a near side of the placing table 52 are located within movable ranges of the robotic arms $2_A$ and $2_B$. When taking this assembly parts 53 out of the placing table 52, the control unit 6 controls the operation shafts of the robotic arms $2_A$ and $2_B$ and the carriage 7 to operate the robotic arms $2_A$ and $2_B$ so that the control points reach the positions at which the assembly parts 53 can be taken out. Here, although the carriage 7 substantially does not move, the operation shafts of the carriage 7 are controlled so that the carriage reference point is kept at the reference work position P1.

Note that, to keep the carriage reference point at the reference work position P1, the positional relationship between the marker 51 detected by the marker detecting unit 64 and the carriage 7 may be used. For example, the control unit 6 may obtain a position error (positional deviation) of the carriage reference point with respect to the reference work position P1 based on the positional relationship between the detected marker 51 and the carriage 7, and control the operation shafts of the carriage 7 to cancel this position error.

Note that, without limiting the carriage reference point to be kept at the reference work position P1, the positions of the control points may be corrected based on the amount of the position error of the carriage reference point with respect to the reference work position P1. In other words, the control unit 6 may be configured to obtain, based on the positional relationship between the marker 51 and the carriage 7, control points reflecting the correction of the position error of the carriage reference point with respect to the reference work position P1, and control at least the operation shafts of the robotic arms $2_A$ and $2_B$ or the operation shafts of the carriage 7 based on the corrected control points.

Further, for example, the assembly parts 54 placed at a deeper side on the placing table 52 are located outside the movable ranges of the robotic arms $2_A$ and $2_B$. When taking this assembly parts 54 out of the placing table 52, the control unit 6 controls the operation shafts of the robotic arms $2_A$ and $2_B$ and the carriage 7 to move the carriage 7 from the reference work position P1 while operating the robotic arms $2_A$ and $2_B$ so that the control points reach the positions at which the assembly parts 54 can be taken out. Thus, by the robotic arms $2_A$ and $2_B$ and the carriage 7 cooperating with each other, the control point of the robot 1 can be moved even to a target position outside the movable ranges of the robotic arms $2_A$ and $2_B$ when the carriage reference point is at the reference work position P1.

As described above, the robot 1 of this embodiment is a self-traveling articulated robot introduced to the production factory 100 to perform work. The robot 1 includes the carriage 7 having at least two operation shafts driven by the servomotors 85a and 85b, respectively, and self-travelable in the two-dimensional plane, the robotic arms $2_A$ and $2_B$ supported by the carriage 7 and having at least one operation shaft driven by the servomotor ($91_A$, $93_A$, $91_B$, $93_B$) and constituting the joint, the end effectors 5 provided to the tip portions of the robotic arms $2_A$ and $2_B$, and the control unit 6 provided in the carriage 7 and for controlling the operation shafts of the robotic arms $2_A$ and $2_B$ and the carriage 7 to operate in cooperation with each other so that the control points defined in the robotic arms $2_A$ and $2_B$ or the end effectors 5 reach the target positions. In other words, the control unit 6 performs the servo control on the robotic arms $2_A$ and $2_B$ and the carriage 7, so as to follow the target values of the control amounts such as the positions, azimuths, postures, etc. of the particular control points, such as tip positions of the end effectors 5.

As described above, when the robot 1 of this embodiment works, the robotic arms $2_A$ and $2_B$ and the carriage 7 work in cooperation with each other. In other words, the robotic arms $2_A$ and $2_B$ is workable while the carriage 7, which is a pedestal of the robotic arms $2_A$ and $2_B$, moves. Therefore, the control points of the robot 1 can even reach the target positions outside the movable ranges of the robotic arms $2_A$ and $2_B$, and the working range of the robot 1 expands. Moreover, since the operation shafts of the carriage 7 are also servo-controlled by the control unit 6, the control points are movable to the target positions at high accuracy.

Moreover, in the self-traveling articulated robot 1 of this embodiment, the control unit 6 has the plurality of control modes including the working mode for controlling the operation shafts of the robotic arms $2_A$ and $2_B$ and the carriage 7 so that the control points reach the target positions, and the traveling mode for controlling the operation shafts of the carriage 7 so that the carriage reference point defined in the carriage 7, the robotic arms $2_A$ and $2_B$, or the end effectors 5 reaches the target position.

As described above, in the robot 1 of this embodiment, by switching the control mode of the control unit 6, a control suitable for each of the movement during the work and the movement between the charging position P2 and the reference work position P1 is performed. Thus, a load on the control unit 6 is reducible.

The self-traveling articulated robot 1 of this embodiment further includes the positioning unit 63 for detecting the current position of the carriage 7. The control unit 6 is configured to control the operation shafts of the carriage 7 in the traveling mode so that the carriage reference point reaches the target position, based on the current position of the carriage 7 detected by the positioning unit 63.

Thus, for example, the robot 1 can move a longer distance in the movement of the robot 1 between the charging position P2 and the reference work position P1 than during the work, and also by using the positioning unit 63, the load of the control unit 6 is reduced.

Further, the self-traveling articulated robot 1 of this embodiment further includes the marker detecting unit 64 for detecting the positional relationship between the marker 51 provided at or near the target position of the carriage reference point and the carriage 7. The control unit 6 is configured to control the operation shafts of the carriage 7 in the traveling mode so that the carriage reference point reaches the target position, based on the positional relationship between the marker 51 and the carriage 7.

Thus, for example, the robot 1 can move a longer distance in the movement of the robot 1 between the charging position P2 and the reference work position P1 than during the work, and by using the marker detecting unit 64, the robot 1 can be positioned comparatively accurately.

In the self-traveling articulated robot 1 of this embodiment, the target position of the carriage reference point is the given reference work position P1 where the work is performed. Alternatively, the carriage 7 of the self-traveling articulated robot 1 of this embodiment is equipped with the battery 88 for supplying electric power to the control unit 6, and the target position of the carriage reference point is the charging position P2 defined in the charging station 49 for charging the battery 88.

Thus, the self-traveling articulated robot 1 of this embodiment is capable of self-traveling between the reference work position P1 and the charging position P2. Note that in this embodiment, the control unit 6 controls the robot 1 in the traveling mode when the robot 1 moves between the reference work position P1 and the charging position P2; however, the control unit 6 may control the robot 1 in the working mode also in the case described above.

The preferred embodiment of the present invention is described above. From the above description, it is apparent for a person skilled in the art that many improvements and other embodiments of the present invention are possible. Therefore, the above description is to be interpreted only as illustrations, and is only provided in order to teach the person skilled in the art a best mode to implement the present invention. Details of the structures and/or the functions may substantially be changed, without departing from the spirit of the present invention.

DESCRIPTION OF REFERENCE CHARACTERS

1: Self-traveling Articulated Robot
$2_A$, $2_B$: Robotic arm
5: End Effector
6: Control Unit
7: Carriage
8: Traveling Device
$20_A$, $20_B$: Base Shaft
$21_A$, $21_B$: First Link
$22_A$, $22_B$: Second Link
$30_A$, $30_B$: Link Member
49: Charging Station
50: Conveying Line (One Example of Workbench)
51: Marker
52: Placing Table
53, 54: Assembly Part
61: Controller
62: Servo Amplifier
63: Positioning Unit
64: Marker Detecting Unit
80a, 80b: Driving Wheel
81: Universal Wheel
85a, 85b: Servomotor
86a, 86b: Power Transmission Device
87a, 87b: Drive Mechanism
88: Battery
89: Charging Electrode
90: Camera
$91_A$, $91_B$, $93_A$, $93_B$: Servomotor
$92_A$, $92_B$, $94_A$, $94_B$: Power Transmission Device
100: Production Factory
P1: Reference Work Position
P2: Charging Position

What is claimed is:
1. A self-traveling articulated robot for working in a production factory, comprising:
a carriage having at least two operation shafts and a plurality of servomotors, each operation shaft being driven by a different servomotor of the plurality of servomotors, and the carriage being configured to self-travel in a two-dimensional plane;

a robotic arm supported by the carriage and having at least one operation shaft driven by a servomotor and constituting a joint;

an end effector provided to a tip portion of the robotic arm;

a positioning unit configured to detect an absolute position of the carriage; and a control unit provided in the carriage and for controlling the operation shaft of the robotic arm and the operation shafts of the carriage, wherein the control unit has a plurality of control modes including:

a working mode in which the control unit controls a position of the operation shaft of the robotic arm and positions of the operation shafts of the carriage by calculating a current position of a control point in a three-dimensional space from rotational positions of the servomotor of the robotic arm and the servomotors of the carriage, the control point being defined in one of the robotic arm and the end effector, generating, based on the current position of the control point in the three-dimensional space, a control signal by which the control point reaches a target position in the three-dimensional space by cooperation of the operation shaft of the robotic arm and the operation shafts of the carriage, and supplying drive currents corresponding to the control signal to the servomotor of the robotic arm and the servomotors of the carriage; and a traveling mode in which the control unit controls the positions of the operation shafts of the carriage by calculating a carriage reference point from a current position of the carriage in a two-dimensional plane, the carriage reference point being defined in one of the carriage, the robotic arm, and the end effector, the current position of the carriage in the two-dimensional plane being detected by the positioning unit, generating a control signal by which the carriage reference point reaches a target position in the two-dimensional plane; and supplying drive currents corresponding to the control signal to the servomotors of the carriage.

2. The self-traveling articulated robot of claim 1, further comprising a marker detecting unit for detecting a positional relationship between a marker and the carriage, the marker provided at or near the target position of the carriage reference point, wherein, based on the positional relationship between the marker and the carriage, the control unit controls the operation shafts of the carriage in the traveling mode so that the carriage reference point reaches the target position.

3. The self-traveling articulated robot of claim 2, wherein, based on the positional relationship between the marker and the carriage, the control unit controls at least the operation shaft of the robotic arm or the operation shafts of the carriage in the working mode so as to correct a position error of the carriage with respect to a given reference work position where the work is performed.

4. The self-traveling articulated robot of claim 1, wherein the target position of the carriage reference point is a given reference work position where the work is performed.

5. The self-traveling articulated robot of claim 1, wherein, the carriage is equipped with a battery for supplying electric power to the control unit, and the target position of the carriage reference point is a charging position defined in a charging station provided in the production factory and for charging the battery.

\* \* \* \* \*